April 24, 1962
W. J. FOWLER
3,030,702
SEAL INSTALLATION TOOL
Filed March 2, 1959
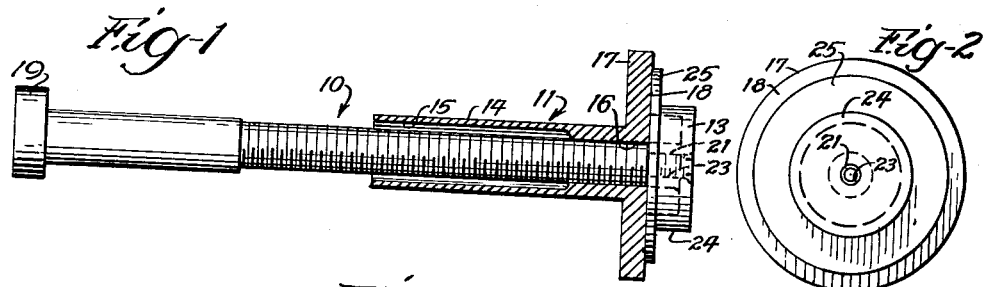
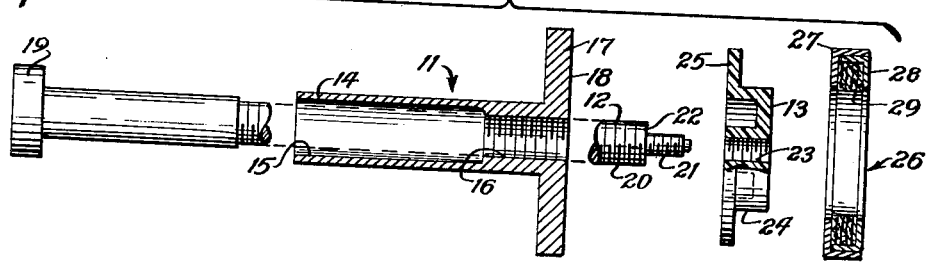
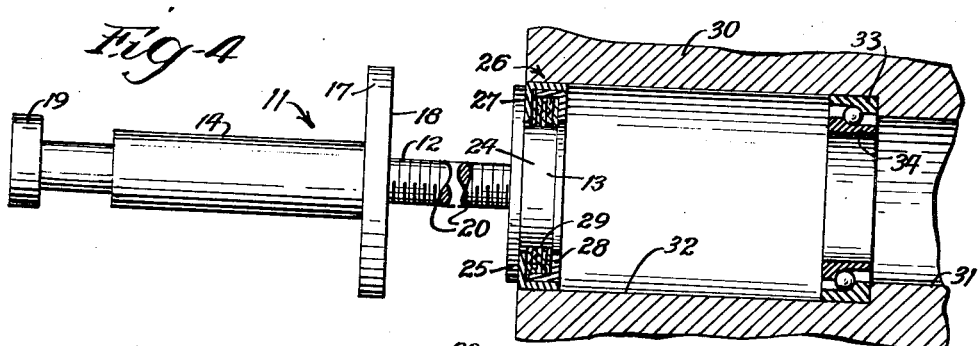
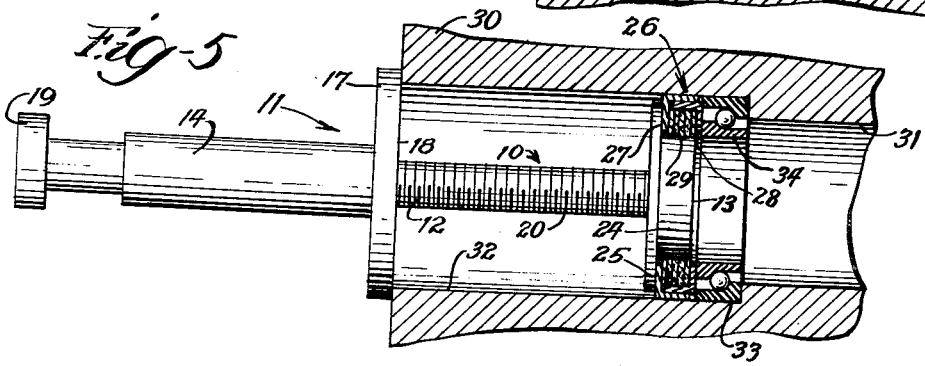
INVENTOR.
William J. Fowler
BY
Cromwell, Greist & Warden
Attys.

United States Patent Office 3,030,702
Patented Apr. 24, 1962

3,030,702
SEAL INSTALLATION TOOL
William J. Fowler, Chicago, Ill., assignor to Chicago Rawhide Manufacturing Company, Chicago, Ill., a corporation of Illinois
Filed Mar. 2, 1959, Ser. No. 796,575
4 Claims. (Cl. 29—280)

The present invention is directed to a new and improved form of a shaft sealing member installation tool designed particularly for manual use. More specifically, the present invention is directed to a new and improved seal installation tool incorporating therein adjustable features providing for ready and efficient sealing member installation in the bore of a shaft housing to variable depths therein.

It is an object of the present invention to provide a new and improved seal installation tool of low-cost design and capable of ready and efficient use in the installation of sealing members to variable depths within the bore of a shaft housing.

Another object is to provide a new and improved seal installation tool of the type described in the foregoing object, which tool is particularly adapted for inclusion as part of a kit including a series of replaceable seal mounting means to accommodate seals of different sizes, the tool further being adjustable to a rather substantial extent to vary the operative length thereof for efficient and non-damaging seal installation in the bores of shaft housings including seal mounting positions located at variable depths therein.

Other objects not specifically set forth will become apparent from the following detailed description of the present invention made in conjunction with the drawings wherein:

FIG. 1 is an elevation of the seal installation tool of the present invention illustrating the same in its fully retracted condition;

FIG. 2 is an end view of the tool illustrating the seal mounting portion thereof;

FIG. 3 is an exploded longitudinal section of the various elements of the tool in combination with a conventional form of oil seal, certain of the elements being broken away in part;

FIG. 4 is a fragmentary partial section of the tool illustrating the initial positioning thereof for operative use in the installation of a seal in the bore of a shaft housing; and FIG. 5 is a view similar to FIG. 4 illustrating the final positioning of the tool upon completion of seal installation.

Referring particularly to FIGS. 1–3, the seal installation tool 10 of the present invention includes a shaft housing abutment means generally designated by the numeral 11, a positionally adjustable rod-like means 12 and a seal mounting means 13. The abutment means 11 includes an elongated annular sleeve portion 14 provided with an internal bore 15 through which the rod 12 is telescopically received. The bore 15 includes an end portion 16 of reduced diameter which is threaded. One end of the abutment means 11 is provided with an integrally formed, radially directed abutment flange 17 which, in the form illustrated, is annular. The rod 12 extends through the center of the flange 17 in projecting relation outwardly of the shaft housing abutment face 18 thereof.

The rod 12 may be of any suitable form and is illustrated as, in effect, a bolt-like member of rather substantial length. One end of the rod 12 is provided with an enlarged head 19 which over extends the adjacent end face of the sleeve portion 14 of the abutment means 11.

A substantial portion of the rod 12 is provided with a continuous thread 20 which is mechanically engaged with the thread of the end portion 16 of the bore 15. It will be noted that the thread 20 need not extend the full length of the rod 12 but should be of adequate length to permit full extension of the rod 12 toward the right as viewed to bring the head 19 into close positioning with the adjacent end of the sleeve portion 14 of the abutment means 11. Actually, for purposes of the present invention, the rod 12 may be of much greater length than illustrated, depending upon the extent to which the threaded portion thereof must extend or project beyond the abutment face 18 and, further, depending upon the extent to which the head 19 desirably projects beyond the opposite end of the abutment means 11.

The threaded end of the rod 12 is provided with a projecting stud 21 which defines on the end of the rod 12 an annular, radial shoulder 22. The stud 21 is threaded for engagement in a threaded bore 23 of the seal mounting means 13. Upon mounting of the seal mounting means 13 on the stud 21, the rear face of the seal mounting means 13 engages the radial shoulder 22 of the rod 12 to back-up the seal mounting means 13. This means is in the form of an adaptor provided with an annular and axially directed seal mounting surface 24 and a seal back-up means in the form of a radial, annular flange 25 positioned at the rear edge of the seal mounting surface 24 for engagement with a radial face of a seal 26 which may be of any suitable construction. The seal 26 illustrated is a leather seal which is formed from telescoped casing members 27 and 28 which form a housing for retaining a leather sealing ring 29.

In assembling the tool 10 for operative use thereof, the rod 12 is threadedly advanced through the abutment means 11 and the seal mounting means 13 is threadedly secured on the stud 21. The seal 26 is mounted on the seal mounting means 13 and the rod 12 is advanced through the abutment means 11 to an extent that the seal 26 projects beyond the abutment face 18 a predetermined distance.

FIGS. 4 and 5 illustrate installational use of the tool 10 in connection with a shaft housing 30 including a shaft-receiving bore 31 which has an end portion 32 of increased diameter as defined by a radially extending annular shoulder 35 having mounted thereagainst a bearing 34. The first step of seal installation is illustrated in FIG. 4 wherein the tool 10 is aligned with the bore 32 and initial introduction of the seal 26, seal mounting means 13 and projecting end of the rod 12 into the bore 32 occurs. The seal mounting means 13 is selected from a set of varying sizes of seal mounting means included in an installation kit of which the tool 10 forms a part. The seal mounting means 13 is selected for the mounting of a particular size seal 26 and, in this respect, the flange 25 thereof is of a diameter to be received within the bore 32. The bolt head 19 is utilized as a striking or pressure surface to force the seal 26, seal mounting means 13 and projecting end of the rod 12 into the bore 32 to ultimately position the seal 26 in abutment with the bearing 34 as illustrated in FIG. 5. In order to prevent damage to the seal 26 while properly installing the same under force, the extent to which the rod 12 is threadedly advanced outwardly of the abutment face 18 of the abutment means 11 is initially determined by the depth to which the seal 26 is to be mounted in the bore 32. Consequently, upon appropriate adjustment of the tool 10 prior to installation of the seal 26, the abutment face 18 of the flange 17 of the abutment means 11 will be brought into engagement with the outer face of the shaft housing 30 at the same time that the seal 26 is forced into engagement with the bearing 34. With this arrangement, continued striking of the head 19 of the bolt 12 does not result in damage to the seal 26 following proper positioning of the same within the bore 32 as the flange 17 in engagement with the shaft housing 30 absorbs the shock of the blows delivered to the bolt 12 and relieves the seal 26 from the damaging effect of such blows. What would normally constitute seal damaging shock is distributed by the flange 17 directly to the shaft housing 30. It will also be appreciated that, under these circumstances, damage to the bearing 34 will be prevented by alleviation of undue force applied thereto during seal installation.

Where possible, it will be appreciated that the use of the tool 10 in installing a seal 26 may be somewhat different from that described above. For example, the head 19 of the bolt 12 may be in the form of a hex head and the tool 10 may be aligned with the bore 32 without the rod 12 thereof projecting to the predetermined extent of the depth of the bore 32. Using this procedure, the abutment face 18 of the abutment means 11 may be engaged with the outer face of the shaft housing 30 and the rod 12 may be threadedly advanced into the bore 32 by the application of a torque by means of a wrench or the like applied to the head 19. Threaded advancement of the rod 12 through the abutment means 11 will result in advancement of the seal 26 into the housing 32. When using this procedure, care must be taken not to advance the rod 12 to an extent which is greater than the depth of the bore 32 which could result in damage to the seal 26. Accordingly, the preferred procedure is that of initial, prepositioning of the seal 26 away from the abutment face 18 to an extent which equals the depth of the bore 32 so as to place the seal in its operative position in engagement with the bearing 34 at the precise moment that the abutment face 18 engages the outer face of the shaft housing 30.

The seal mounting means 13 is in the form of an adaptor and, as described above, is a part of a set of similar adaptors of varying sizes for use in installing seals of varying diameters. These adaptors may be readily formed from molded plastic in any suitable manner thus providing for a relatively inexpensive installation kit having a single tool 10 and a complete set of adaptors 13.

Obviously certain modifications and variations of the invention as hereinbefore set forth may be made without departing from the spirit and scope thereof, and therefore only such limitations should be imposed as are indicated in the appended claims.

I claim:

1. A tool for use in the installation of seals in the bore of a housing, said tool comprising an abutment means in the form of a sleeve-like member provided with an integrally formed and radially directed abutment flange at one end thereof for engagement with a portion of said housing surrounding said bore, rod-like means received through said sleeve-like member and abutment flange in telescoped relation, position fixing means operable between said sleeve-like member and said rod-like means to variably fix said rod-like means and said sleeve-like member relative to one another with one end of said rod-like means projecting outwardly of the face of said abutment flange which is arranged for engagement with said housing portion, said projecting end being provided with a radial shoulder portion in abutment with which is a seal mounting means removably mounted on said projecting end, said seal mounting means being variably positionable in spaced relation to said abutment flange by movement of at least one of said sleeve-like member and rod-like means relative to the other as determined by the extent to which said seal mounting means is to be received in said bore, the other end of said rod-like means being provided with an enlarged portion which is of sufficient diameter relative to the adjacent end of said sleeve-like member to overlap the same, said enlarged portion being adapted for striking to fix a seal in said bore, said sleeve-like member having an annular sleeve portion extending rearwardly from said abutment flange toward said enlarged portion of said rod-like means to stabilize said rod-like means during seal installational use of said tool.

2. The tool of claim 1 wherein said position fixing means constitutes engaged threads formed on at least a portion of the inner surface of said abutment means and the outer surface of said rod-like member.

3. A tool for use in the installation of seals in the bore of a housing, said tool comprising an abutment means in the form of a sleeve-like member provided with an integrally formed and radially directed abutment flange at one end thereof for engagement with a portion of said housing surrounding said bore, rod-like means received through said sleeve-like member and abutment flange in telescoped relation, position fixing means operable between said sleeve-like member and said rod-like means to variably fix said rod-like means and said sleeve-like member relative to one another with one end of said rod-like means projecting outwardly of the face of said abutment flange which is arranged for engagement with said housing portion, said projecting end being provided with a radial shoulder portion in abutment with which is a seal mounting means removably mounted on said projecting end, said seal mounting means being provided with an annular and axially directed seal mounting surface, a seal back-up means in the form of a radial flange positioned at the rear edge of said seal mounting surface for engagement with a radial face of a seal carried on said surface, said seal mounting means being variably positionable in spaced relation to said abutment flange by movement of at least one of said sleeve-like member and rod-like means relative to the other as determined by the extent to which said seal mounting means is to be received in said bore, the other end of said rod-like means being provided with an enlarged portion which is of sufficient diameter relative to the adjacent end of said sleeve-like member to overlap the same, said enlarged portion being adapted for striking to fix a seal in said bore, said sleeve-like member having an annular sleeve portion extending rearwardly from said abutment flange toward said enlarged portion of said rod-like means to stabilize said rod-like means during seal installational use of said tool.

4 The tool of claim 3 wherein said position fixing means constitutes engaged threads formed on at least a portion of the inner surface of said abutment means and the outer surface of said rod-like member.

References Cited in the file of this patent

UNITED STATES PATENTS

| | | |
|---|---|---|
| 1,636,831 | Ogden | July 26, 1927 |
| 2,652,733 | Gilda | Sept. 22, 1953 |
| 2,839,823 | Brancato | June 24, 1958 |
| 2,860,535 | Fowler | Nov. 18, 1958 |
| 2,945,403 | Egger | July 19, 1960 |